(No Model.)
S. J. FISH.
CULTIVATOR SHOVEL AND KNIFE.
No. 447,305. Patented Mar. 3, 1891.
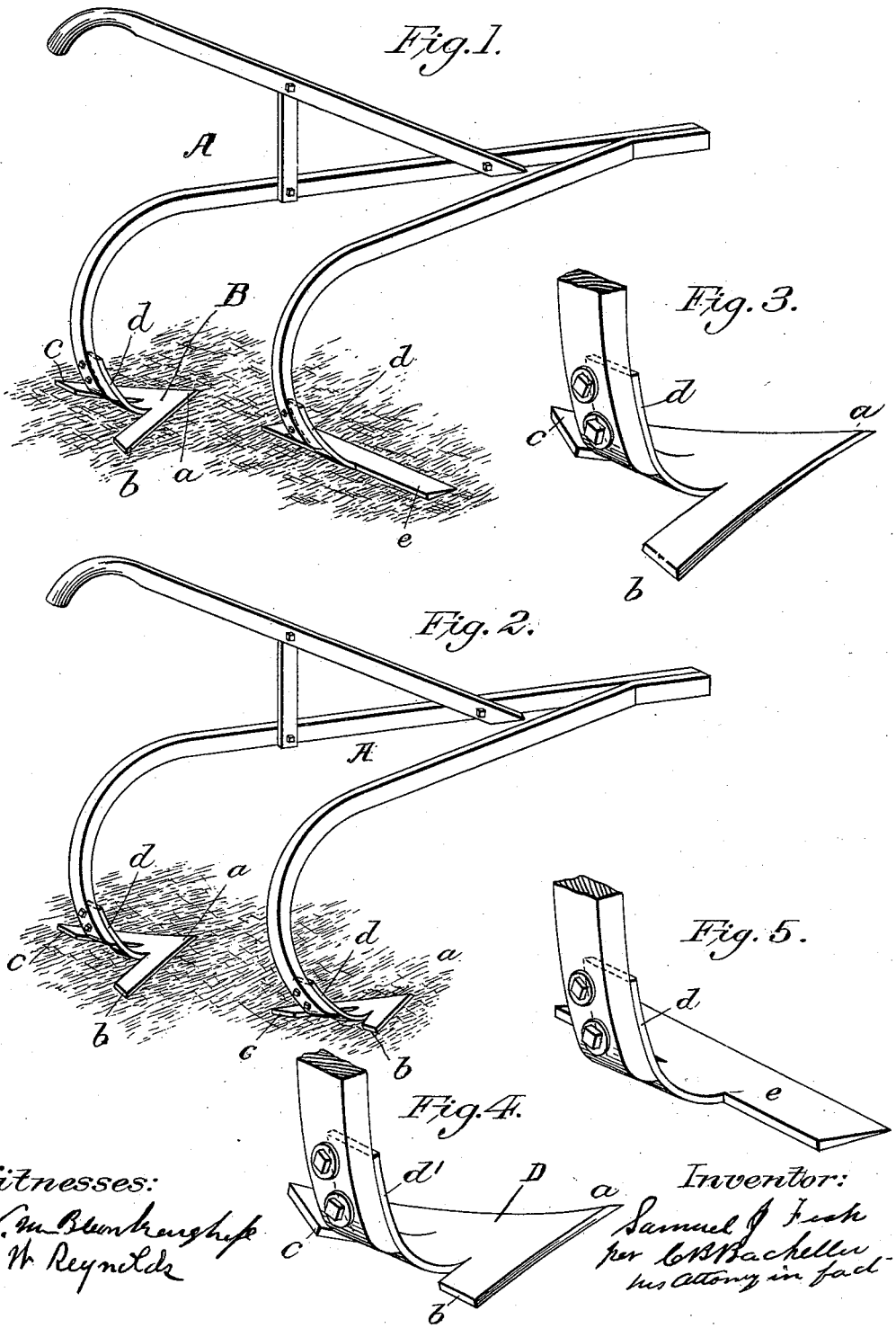

UNITED STATES PATENT OFFICE.

SAMUEL J. FISH, OF EMPORIA, KANSAS.

CULTIVATOR SHOVEL AND KNIFE.

SPECIFICATION forming part of Letters Patent No. 447,305, dated March 3, 1891.

Application filed August 6, 1889. Serial No. 319,951. (No model.)

*To all whom it may concern:*

Be it known that I, SAMUEL J. FISH, a citizen of the United States, residing at the city of Emporia, in the county of Lyon and State of Kansas, have invented certain new and useful Improvements in Cultivator Shovels and Knives; and I do hereby declare that the following is a full, clear, and exact description of the invention, which will enable others skilled in the art to which it appertains to make and use the same.

The present invention relates to cultivators, and particularly to the class of corn-hoes and weeding-blades.

The objects of my invention are, first, to thoroughly pulverize all the ground between the rows of corn; second, by the use of the short lateral arms on the outside but little soil is thrown around the small corn; third, the knives cut the weeds below their heart, so as to destroy them.

Figure 1 is a perspective view of a machine having rear shovel and knife. Fig. 2 is a similar view showing a rear shovel and a corn-hoe. Fig. 3 is a perspective view of a main shovel. Fig. 4 is a perspective view of a corn-hoe or weeding-blade, and Fig. 5 is a perspective view of a knife.

Like letters of reference denote like parts throughout the drawings.

Attached to the frame A is a corn-hoe B, having a diamond point $a$, rear corners $b$ and $c$, and a central projection $d$, bent upward and slightly forward, having apertures to receive suitable set-screws or bolts for securing it to the said cultivator-frame. This hoe B covers nearly all the space between two rows of corn, and the corners $b$ and $c$, projecting slightly upward, the soil is thoroughly pulverized between the rows. As shown by Figs. 1 and 5, a weed cutter or blade $e$, having the same central projection $d$ as the hoe B, is also attached to the frame A, so as to cut the weeds below the surface of the earth and destroy their growth, also loosening the soil and leaving less work to be done by the hoe B.

The hoe or blade shown by Fig. 4 is the construction covered by the claim and forms the major part of my invention. It is more especially adapted for cultivating check-rows of corn. This hoe D has a central arm or shank $d'$ bent outward and upward, so as to be attached to the frame A, and has two cutting-wings $b$ and $c$, with their inner sides curved slightly upward, so as to prevent them from being dulled. The outer one of these wings is shortened to about one-half the length of the inner wing for the purpose of throwing less soil over the corn and pulverizing the soil near the corn.

By the shape and relative position of the wings $b$ and $c$ of the hoe D the sharp edges of the upturned portions cut the weeds and at the same time thoroughly pulverize the soil.

Having thus described my invention, what I claim as new, and desire to secure by Letters Patent, is—

A corn-hoe or weeding-blade substantially horizontal in working position, having a diamond point and a central arm or shank bent outward and upward and having cutting-wings with their inner sides curved slightly upward, the outer wing being shortened to about one-half the length of the inner wing, substantially as described.

SAMUEL J. FISH.

Witnesses:
J. C. BURNETT,
W. SILING.